United States Patent [19]

Rawers et al.

[11] Patent Number: 5,564,620
[45] Date of Patent: Oct. 15, 1996

[54] FORMING METAL-INTERMETALLIC OR METAL-CERAMIC COMPOSITES BY SELF-PROPAGATING HIGH-TEMPERATURE REACTIONS

[76] Inventors: James C. Rawers; David E. Alman; Arthur V. Petty, Jr., all of Albany Research Center, Bureau of Mines, Department of the Interior, 1450 Queen Ave., Albany, Oreg. 97321

[21] Appl. No.: 139,688

[22] Filed: Oct. 22, 1993

[51] Int. Cl.[6] .......................... B23K 20/02; B23K 31/00
[52] U.S. Cl. .......................... 228/265; 228/190; 228/198
[58] Field of Search .................. 228/265, 190, 228/198, 235.1, 248.1, 124.5; 149/15, 108.2; 148/515

[56] References Cited

U.S. PATENT DOCUMENTS

| | | | |
|---|---|---|---|
| 4,732,556 | 3/1988 | Chiang et al. | 425/405.2 |
| 5,121,871 | 6/1992 | Beavis et al. | 228/198 |
| 5,188,678 | 2/1993 | Sekhar et al. | 148/514 |
| 5,198,187 | 3/1993 | Lu et al. | 419/35 |
| 5,381,944 | 1/1995 | Makowiecki et al. | 228/124.5 |

FOREIGN PATENT DOCUMENTS 481384  12/1975  U.S.S.R. ................ 228/190

Primary Examiner—Samuel M. Heinrich

[57] ABSTRACT

Industrial applications of composites often require that the final product have a complex shape. In this invention intermetallic or ceramic phases are formed from sheets of unreacted elemental metals. The process described in this invention allows the final product shape be formed prior to the formation of the composite. This saves energy and allows formation of shaped articles of metal-intermetallic composites composed of brittle materials that cannot be deformed without breaking.

5 Claims, 3 Drawing Sheets

FORMING METAL-INTERMETALLIC OR METAL-CERAMIC COMPOSITES BY SELF-PROPAGATING HIGH-TEMPERATURE REACTIONS

BACKGROUND OF THE INVENTION

This invention relates to the formation of metal-intermetallic or metal-ceramic composites. In particular, this invention relates to processes for the formation of shaped metal-intermetallic composites from sheets of unreacted elemental metals.

A self-propagating, high-temperature reaction (SHS reaction) is a process in which a chemical reaction once initiated will continue on its own. SHS reactions may be used to cause the reaction of elemental metals with the resulting formation of intermetallic or ceramic phases which are bonded with elemental metal phases.

U.S. Pat. No. 3,503,814 discloses pyrotechnic compositions containing Ni, Al, Mg, $Fe_2O_3$, or Bi. The compositions may be pressed into pellets or powder mixtures or laminate strips may be rolled to form composite sheet materials. The mixtures also may be made into thin strips or wire by cold extrusion, swaging, drawing and rolling.

U.S. Pat. No. 3,690,849 discloses a cermet-type alloy for coating of heat-resistant alloys. An alloy is coated with a particulated mixture containing Ti and or Zr which react with Si and or B forming silicides or borides which precipitate as a uniformly dispersed phase in a continuous phase of Ni and or Co base matrix.

U.S. Pat. No. 4,402,776 discloses compositions for self-sustained intermetallic reactions containing 1–20% silicon in addition to 67–79% Ti, 13–30% $B_4C$, up to 10% C, and up to 10% B. The components of these compositions are in powder form.

All prior art disclosures involve the use of powder or particulate reactants in the SHS reactions. The prior art does not disclose methods for manufacturing shaped articles of metal-intermetallic composites using SHS reactions.

SUMMARY OF THE INVENTION

This invention discloses methods for manufacturing shaped articles of metal-intermetallic composites from sheets of diverse unreacted elemental metals. Sheets or foils of unreacted elemental metals are laid-up in the desired order. The desired article shape is formed using a press with shaped male and female mold parts attached to the upper and lower platens. Heat is applied to the press to initiate a SHS reaction; and pressure is applied to the press to bond the unreacted metal and intermetallic layers within the metal-intermetallic composite and aid in eliminating porosity from the interface regions.

Two important advantages are associated with this process. The use of SHS reactions take advantage of the heat produced by the SHS reaction which means that the heat energy which must be supplied in the manufacturing process is reduced. In addition, the process of this invention involves formation of the shape of the finished article by shaping elemental metal sheets. Such sheets are ductile and easily shaped. The resultant metal-intermetallic composite, however, contains an intermetallic phase which is brittle and may be shaped only with great difficulty. This invention makes practical the manufacture of shaped articles comprised of metal-intermetallic composites.

The objective of this invention is to provide for formation of complex near-net-shape metal-intermetallic composite articles.

Another objective is to conserve energy by the use of SHS reactions in formation of shaped metal-intermetallic articles.

Another objective is to form articles comprised of diverse metals bonded to metal-intermetallic composites.

Another objective is to form metal-intermetallic composites by a process which requires only one combined shaping-heating-pressing step.

A final objective is to allow the formation of shaped articles of brittle metal-intermetallic compositions by a process which is effective, efficient, and conserving of energy.

DESCRIPTION OF THE PREFERRED EMBODIMENTS

Figure 1A:
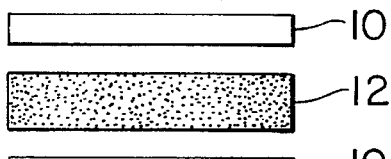
FIG. 1 A–F are diagrammatic representations of the formation of a metal-intermetallic composite.

In this invention intermetallic, also called ceramic, phases are formed from sheets of unreacted elemental metals. The desired resulting composition of the intermetallic phase is determined from the composition of the starting materials and the processing conditions. The sheets are laid up in such a manner that following the SHS reaction, the resulting composition will be that of the desired intermetallic phase. To simplify the discussion, a specific example of the invention will be used throughout this section. This example is not meant to cover the full extent of the invention, but is used to represent a much larger class of possible reactions, far too numerous to cite individually. For example, if the intermetallic phase to be formed is a titanium aluminide, then sheets of Ti are laid between sheets of Al. When the SHS reaction occurs the result will be

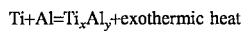

$$Ti+Al=Ti_xAl_y+\text{exothermic heat}$$

In addition, the thickness of the metal sheets can be controlled so that the resulting SHS reaction will not use up all the elemental Ti. This results in a unreacted metal phase bonded to the SHS formed intermetallic phase $Ti_xAl_y$. The thickness of the metal sheets maw vary within the limitation that the sheets be thin enough for shaping without cracking or splitting. Application of pressure after the intermetallic phase is formed enhances the bonding between intermetallic phase and unreacted metal phase.

An SHS reaction is a process in which once a chemical reaction is initiated, the reaction will continue on its own. The SHS reaction for this invention, involving the formation of intermetallic (or ceramic) phases, can be initiated by:

(i) heating up entire lay-ups of elemental metal foils (sheets) until the reaction is started at the interface between the different metal foils (sheets), (ii) heating up the entire system until one of the metals melts or forms a eutectic phase with another metal, or (iii) initiating the reaction by exciting a small portion of the layered structure and causing the reaction to be initiated in one region and thus allowing the SHS reaction to continue through the rest of the material.

The composition of the resulting intermetallic (or ceramic) phase formed from the SHS reaction depends upon the starting metal composition and the processing conditions.

It is possible to form intermetallic phases such as metal-aluminides by reacting metals such as Fe, Ni, or Ti with Al. It is important to note that virtually any combination of elemental metal foils (sheets), or foils (sheets) with powder can be combined, provided sufficient heat is evolved during the exothermic reaction to form a continuous bond at the layer interfaces. It is possible to alloy one or both of the metal phases to change the composition of the resulting intermetallic phase. For example, (i) it is possible to react stainless steel (ss) with Al via SHS reactions. This ss-Al SHS reaction results in the formation of intermetallic phases such as nickel-aluminides and iron-aluminides, with the chromium disbursed as a substitutional element within the metal-aluminides. (ii) It is possible to add metal powders between the metal foil (sheet) layers so as to form either a separate SHS reaction or to change the intermetallic (ceramic) phase formed. For example, addition of iron powder to the aluminum can be used to control the elemental composition of the intermetallic phase formed. Or, a different non-metallic element can be added to the layered structure such as carbon to a Ti-Al foil composite structure resulting in the formation of titanium carbide, titanium-aluminum-carbide, and/or titanium aluminide after the SHS reaction has occurred. Alternately, the sheets can be in the form of powder cloths to provide similar two-dimensional layered structures from powders. Powder cloths would probably be less costly than foils. It is also possible to lay up fibers of materials between the metal sheets and after the SHS reaction has occurred, the fibers are part of the newly formed SHS product.

Figure 1B:
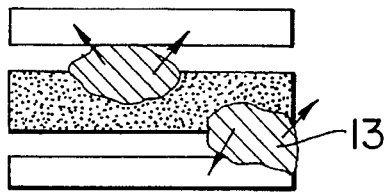
Figure 1C:
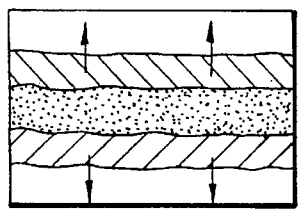
Figure 1D:
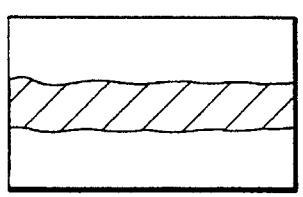
Figure 1E:
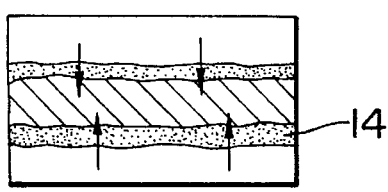
Figure 1F:
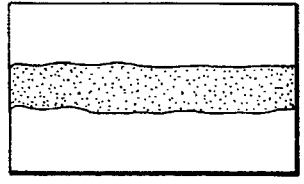

The formation of a metal-intermetallic composite is represented by FIG. 1A–F. In general, a sandwich is formed by laying up x sheets of metal foil, such as Fe, Ni, or Ti, with x-1 Al foils, where x is any number of foils greater than or equal to 2. In FIG. 1A the sandwich was formed by laying up two sheets of Fe 10 and one sheet of Al. In FIG. 1B the SHS reaction has been initiated with localized formation of melted intermetallic composition 13. In FIG. 1C the area of melted intermetallic composition formation has extended from the interface between the Fe and Al sheets into the Fe sheets, as indicated by the arrows. In FIG. 1D all of the Al has been converted into melted intermetallic composition. In FIG. 1E cooling has been initiated with the formation of solid intermetallic composition 14. In FIG. 1F all the melted intermetallic composition has solidified with formation of the resulting metal-intermetallic composite.

Although the above explanation of the microscopic events in the formation of metal-intermetallic composites is consistent with current scientific comprehension of such events, it will be understood that the correctness of this explanation is not essential to the practice of this invention or to the validity of the patent protecting it.

Because the formation of the intermetallic-ceramic phase occurs after the elemental sheets have been laid up, the laid-up sheet structure may be formed or shaped into any desired shape prior to initiating the SHS reaction. Because the starting elemental sheets are easily deformed, and deformation occurs without any damage to the final article, this process results in formation of complex near-net-shape structures comprised of metal-intermetallic composites.

FIG. 2 A–D is a diagrammatic representation of the manufacture of shaped articles of metal-intermetallic composite. FIG. 2A shows laid-up alternating Fe 10 and Al 12 sheets. FIG. 2B shows a conventional hot-press 20 having an upper platen with a male mold 22 and a lower platen with a female mold 24. The laid-up sheets 16 are placed in the press and the press closed, forming the laid-up sheets in the shape of the shaped article. FIG. 2C is an enlarged view showing the shaped laid-up sheets 16 between the male 22 and female 24 molds. A heater for the press is depicted at 26. FIG. 2D is an enlarged view as in 2C with arrows indicating the application of pressure along to the molds which, along with the application of heat, forms the metal-intermetallic composite 18.

EXAMPLE 1

Metal-intermetallic disk composites formed in a hot-press.

Figure 3:
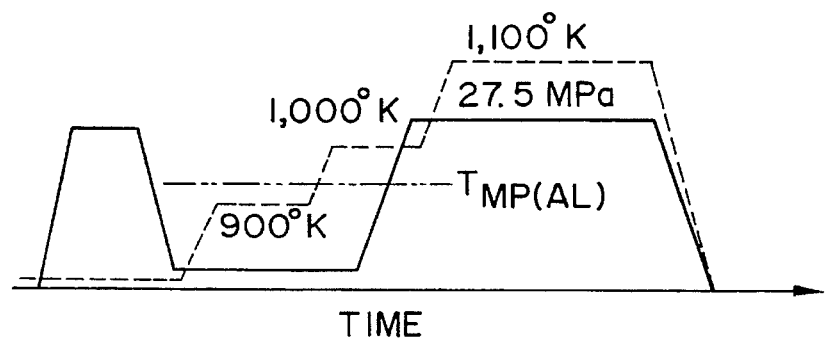
FIG. 3 is a diagram showing the time, temperature, and pressure relations of Example 1.
Figure 2A:
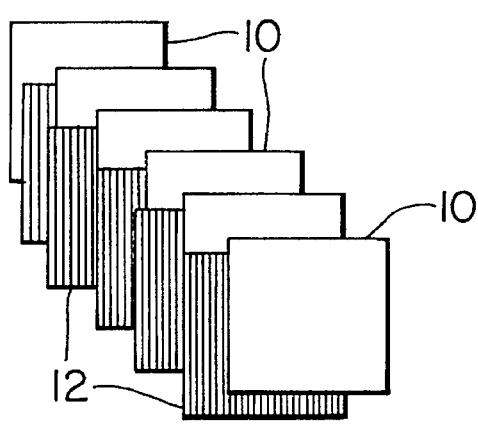
FIG. 2 A–D are diagrammatic representations of the steps in the manufacture of a shaded article of metal-intermetallic composite.
Figure 2C:
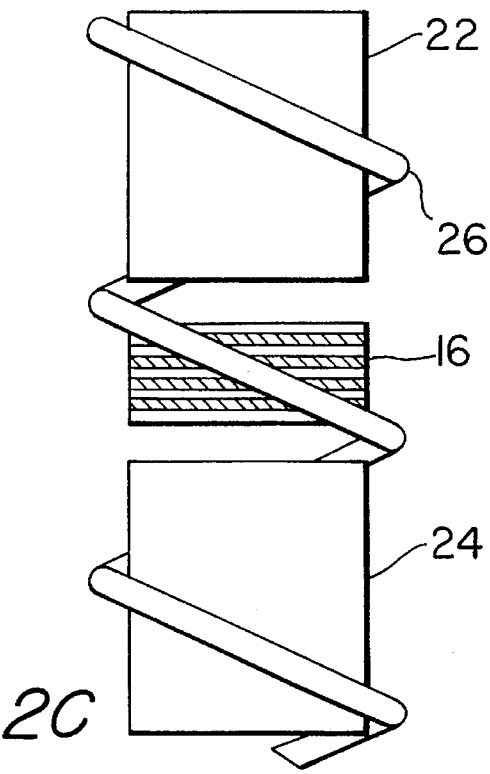
Figure 2B:
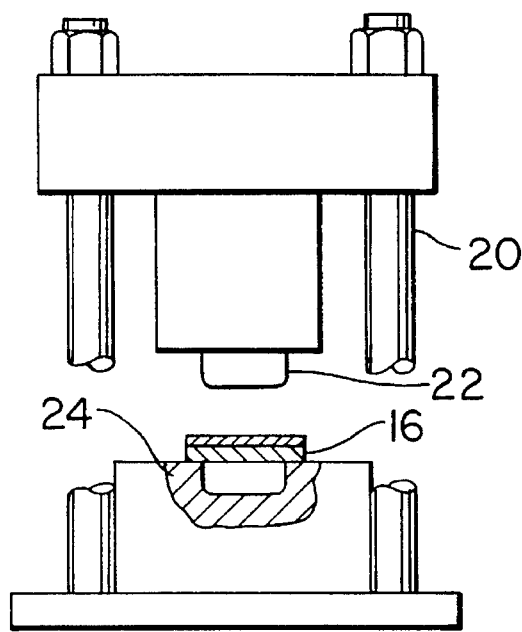
Figure 2D:
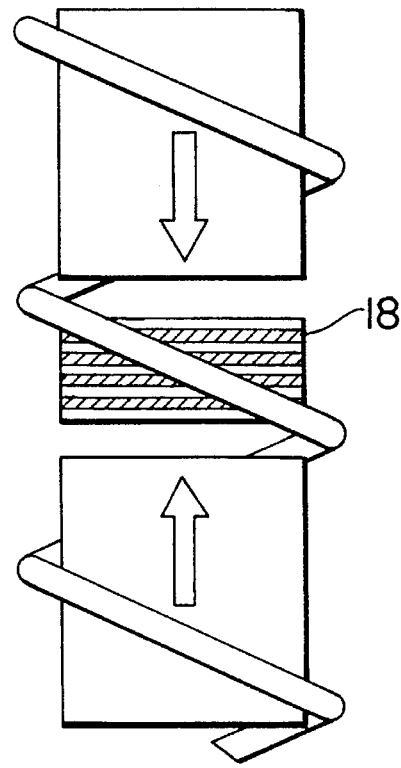

Disks, 2 cm in diameter, and 0.001–0.01 inch in thickness, of Al, Fe, Ni, and Ti were cut from elemental metal sheets. These disks were stacked such that there were alternate layers of Fe and Al, Ni and Al, or Ti and Al. Each disk composite lay-up was placed in a graphite die and separated by graphite spacers. The entire configuration, metal foils and graphite die, was placed in an induction vacuum furnace that was capable of applying pressure to the end plungers of the graphite die. (see FIG. 1). The sample was heated up, in vacuum, in a series of steps to 1,100° K (800° K for 15 min, 900° K for 15 min, 1,000° K for 15 min, 1,100° K for 30 min as shown in FIG. 3. The pressure was raised to 27.5 MPa during the heating at 800° K, released, then raised to 27.5 MPa during the heating at 1,000° K and held there during heating at 1,100° K. The sample was then cooled down and the disk removed and cross-sectioned for microscopic examination. Scanning Electron Microscopy and X-Ray diffraction were used to determine that the Al foils had reacted with the alternate metal (Fe, Ni, or Ti) foils to form intermetallic phases and that the metal and intermetallic phases were firmly bonded together. The intermetallic phases observed were as follows:

| Metal Sheets | Intermetallic Phases Formed |
| --- | --- |
| Fe—Al | $Fe_2Al_5$ and $FeAl_2$ |
| Ni—Al | $NiAl_3$ |
| Ti—Al | $TiAl_3$ |

EXAMPLE 2

Figure 4A:
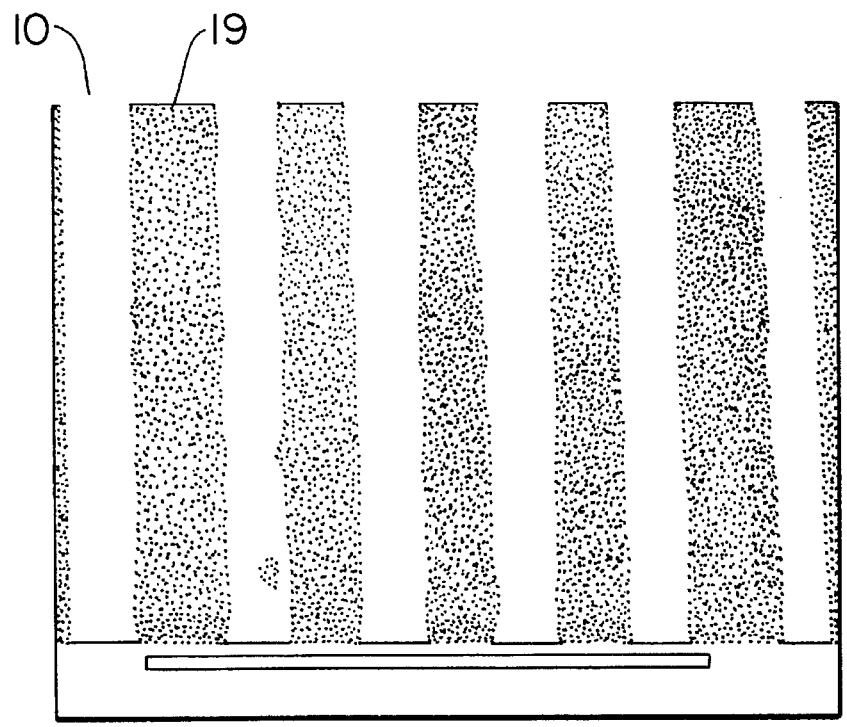
FIG. 4A is a low magnification backscatter micrograph of Fe-Al layered composite.
Figure 4B:
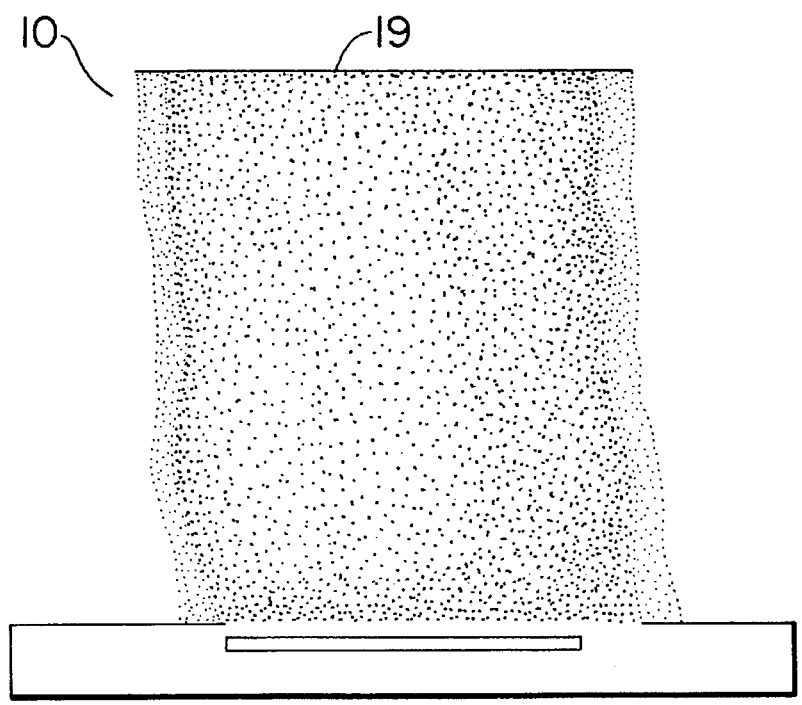
FIG. 4B is a high magnification backscatter micrograph of Fe-Al layered composite.

Sheets of Al, Fe, Fe-1018, Ni, Ti, and Stainless Steel were cut from commercial grade sheets, 5 cm×5 cm, 0.001–0.01 inch thick. These were laid-up as in Example 1. The samples were placed between graphite disks and heated in a vacuum hot-press as in Example 1. Pressure was not applied until the samples had reached 800° K. After cooling the samples were again removed from the furnace and examined. The resulting microstructures are shown in FIGS. 4A and 4B. FIG. 4A is a low magnification backscatter micrograph of a composite formed of Fe and Al sheets. Visible in this micrograph are alternating layers of Fe 10 and intermetallic $Fe_xAl_y$ 19. FIG. 4B is a high magnification backscatter micrograph of the composite of FIG. 4A. Tensile specimens were cut from these layered composites with an EDM machine and tested.

Examination of the failed pieces show that the intermetallic phase was strongly bonded to the metal phase and that no delamination occurred during failure.

EXAMPLE 3

Metal-intermetallic sheet composites formed in an open furnace.

Sheets of Al and Ni, 3 inch by 4 inch, 0.001 to 0.01 inch think, were cut as in Example 2. The laid-up structure was placed between ceramic heating plates. Metal spacers, approximately the same thickness as the layered metal sheets were placed on either side of the laid-up structure to prevent the applied pressure from expelling any molten metal from the composite. Thermocouples were placed within the nickel and aluminum sheets and just outside the composite lay-ups. A dead weight load of 5 Kg was applied to the top heating element which was heated. The temperature of the furnace and the metal composite were monitored during heat up. At the melting point of the aluminum the temperature within the metal composite remained constant while the furnace continued to heat up. After the aluminum had melted, the layered composite returned to the temperature of the furnace. At approximately 700° C. an exothermic reaction occurred within the metal composite. The temperature within the foil increased rapidly and significantly while the furnace temperature increased slowly and steadily. This exothermic reaction is indicative of an SHS reaction.

EXAMPLE 4

Metal-intermetallic sheet composite formed in a vacuum furnace.

Sheets of Al, Fe, Ni, and Ti were cut and laid-up as in Example 3. These composites and the metal spacers were placed in a vacuum furnace and heated-up as in Example 3 except under an inert-gas partial vacuum atmosphere. The results were similar to those in Example 3.

EXAMPLE 5

Shaped metal-intermetallic sheet composites may be formed in a hot-press.

Shaped metal-intermetallic sheet composites may be formed as in Example 1 except that the metal disks may be placed between male and female molds attached to the top and bottom platens of the hot-press, such a mold imparting a shape, such as a cup-shape, to the laid-up sheets. Closing the press imparts the cup-shape to the sheets. The metal-intermetallic composites are subsequently formed by application of heat and pressure as in Example 1.

It will be apparent to those skilled in the art that the examples and embodiments described herein are by way of illustration and not of limitation, and that other examples may be used without departing from the spirit and scope of the present invention, as set forth in the appended claims.

We claim:

1. The process of manufacturing a shaped article of metal-intermetallic composite from sheets of diverse unreacted elemental metals comprising the steps:

a. laying up diverse unreacted elemental metal sheets, b. shaping the desired article shape using a hot-press, c. initiating a self-propagating high-temperature reaction in the hot-press by heating the shaped sheets to a temperature of 1,100° K adequate to initiate a self-propagating high temperature forming a intermetallic composition, and d. applying pressure adequate to insure formation of a metal-intermetallic composition bond until the metal-intermetallic composite is formed.

2. The process of claim 1 further comprising the step prior to step b.:

placing metal powders between the unreacted elemental metal sheets.

3. The process of claim 1 further comprising the step prior to step b.:

placing non-metallic powders between the unreacted elemental metal sheets.

4. The process of claim 1 further comprising the step prior to step b.:

placing fibers between the unreacted elemental metal sheets.

5. The process of manufacturing a shaped article of metal-intermetallic composite from sheets of diverse unreacted elemental metals in the form of powder cloths comprising the steps:

a. laying up diverse unreacted elemental metal sheets in the form of powder cloths, b. shaping the desired article shape using a hot-press, c. initiating a self-propagating high-temperature reaction in the hot-press by heating the shaped sheets in the form of powder cloths to a temperature adequate to initiate a self-propagating high temperature forming a intermetallic composition, and d. applying pressure adequate to insure formation of a metal-intermetallic composition bond until the metal-intermetallic composite is formed.

* * * * *